United States Patent [19]

Bronowicki et al.

[11] Patent Number: 5,030,490

[45] Date of Patent: Jul. 9, 1991

[54] VISCOELASTIC DAMPING STRUCTURES AND RELATED MANUFACTURING METHOD

[75] Inventors: Allen J. Bronowicki, Laguna Niguel; Abner Kaplan, Rancho Palos Verdes, both of Calif.

[73] Assignee: TEW Inc., Redondo Beach, Calif.

[21] Appl. No.: 510,347

[22] Filed: Apr. 17, 1990

Related U.S. Application Data

[63] Continuation-in-part of Ser. No. 282,728, Dec. 9, 1988, abandoned.

[51] Int. Cl.$^5$ .............................................. B32B 17/04
[52] U.S. Cl. .................................... 428/36.4; 188/268; 188/378; 248/560; 248/562; 248/609; 248/634; 248/635; 248/636; 267/136; 267/141; 428/36.3; 428/36.8; 428/48; 428/49; 428/113; 428/295; 428/902
[58] Field of Search ............... 428/36.4, 36.3, 36.8, 428/48, 49, 113, 120, 295, 294, 902; 188/268, 378; 267/136, 141; 248/560, 562, 609, 634, 635, 636

[56] References Cited

U.S. PATENT DOCUMENTS

| | | | |
|---|---|---|---|
| 3,886,024 | 5/1975 | Chase | 428/36.4 |
| 4,177,306 | 12/1977 | Schulz et al. | 428/107 |
| 4,190,131 | 2/1980 | Robinson | 428/36.8 |
| 4,278,726 | 7/1981 | Wieme | 428/229 |
| 4,338,758 | 8/1982 | Hagbjer | 188/268 |
| 4,527,371 | 7/1985 | Hagbjer | 188/378 |
| 4,626,461 | 12/1986 | Prewo et al. | 428/113 |
| 4,759,147 | 7/1988 | Pirazzini | 428/113 |
| 4,812,348 | 3/1989 | Rau | 428/113 |

OTHER PUBLICATIONS

S. S. Sattinger, "Constrained-Layer Damping Effectiveness on Members under Vibratory Extensional Loading", ASME Papers, No. 85-DET 134, Sept. 10-13, 1985, Cincinnati, OH.

Primary Examiner—James J. Seidleck
Assistant Examiner—Archene A. Turner
Attorney, Agent, or Firm—Sol L. Goldstein

[57] ABSTRACT

A composite structure of elastic and viscoelastic components in which dynamic loads are effectively damped by transmission through the viscoelastic components. The structure includes a continuous sandwich comprised either of a single elastic layer enclosed by two viscoelastic layers or of a single viscoelastic layer enclosed by two elastic layers such that the sandwich has little stiffness in any intended direction of loading, and two segmented elastic layers having stiffness in a desired loading direction. The segmented layers have alternating segments and gaps and are disposed one on each side of the viscoelastic layer in such a manner that the gaps of one segmented layer overlap the segments of the other segmented layer. Dynamic loads in the loading direction are transmitted back and forth from one segmented layer to the other, through the continuous sandwich layer containing the viscoelastic material, which thereby provides a high degree of damping. Static loads in the loading direction are transmitted through the elastic material in the continuous sandwich layer. By appropriate selection of elastic materials, the structure can be made suitable for the damping of loads in all directions while maintaining considerable strength and static stiffness. Appropriate selection of fiber orientations can increase the damping effect on either axial and bending loads, or on torsional loads.

22 Claims, 6 Drawing Sheets

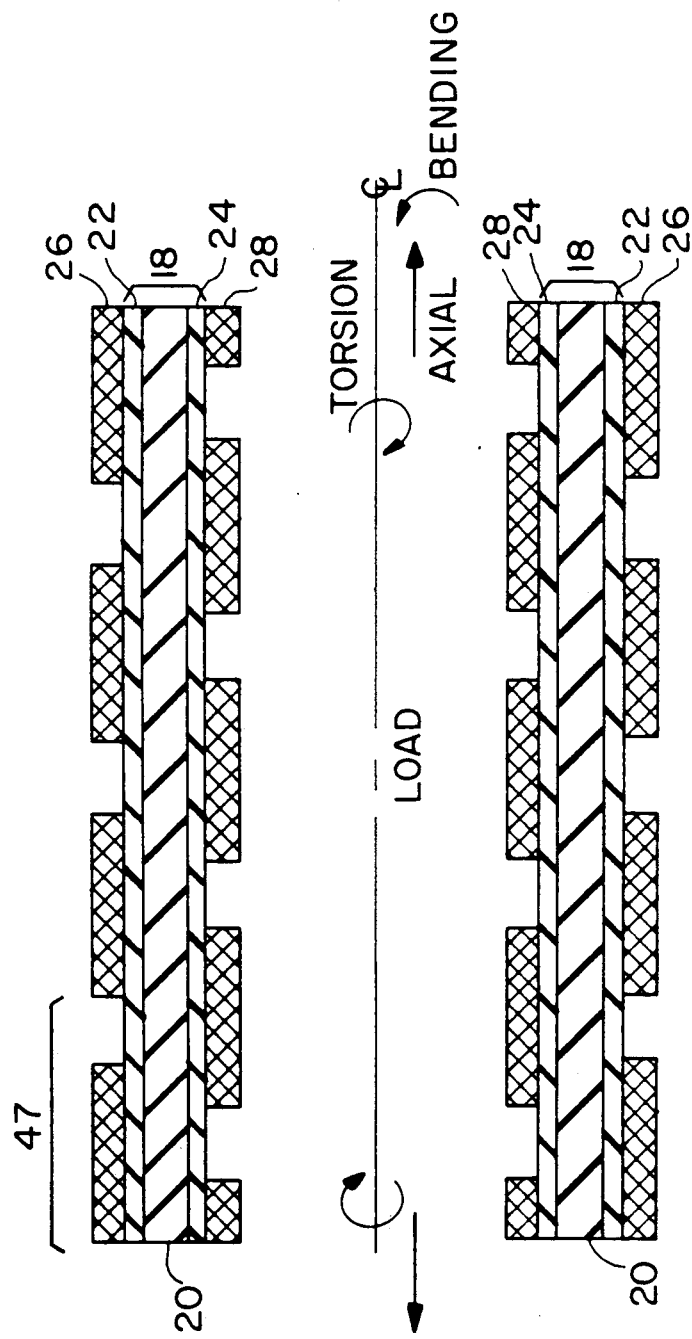

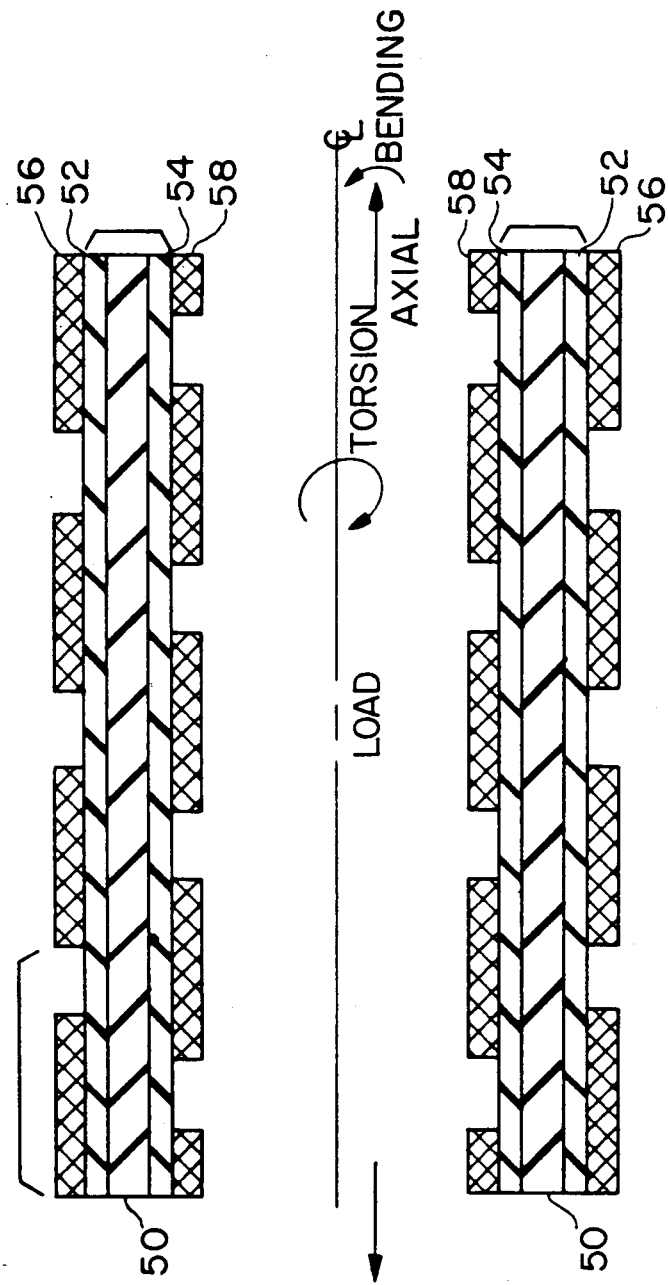

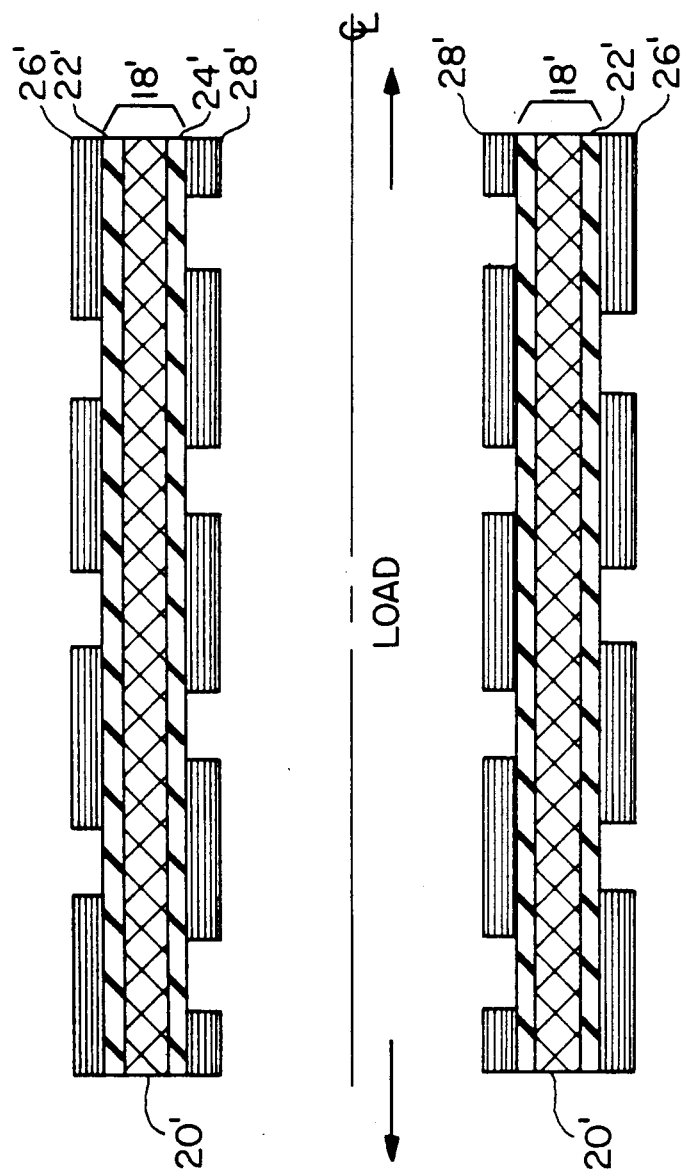

VISCOELASTIC DAMPING STRUCTURES AND RELATED MANUFACTURING METHOD

RELATED APPLICATIONS:

This application is continuation-in-part application of Ser. No. 07/282,728 filed Dec. 9, 1988, now abandoned.

BACKGROUND OF THE INVENTION

This invention relates generally to damped mechanical structures and methods of their manufacture, and, more particularly, to damped structures employing viscoelastic materials. There are a number of applications of mechanical structures in which there is a requirement to damp out oscillations caused by varying mechanical loads, either axial loads, bending and shear loads, or torsional loads. A particularly important category of applications includes structures for use in aerospace vehicles. In these applications, there are three major requirements: stiffness, lightness in weight, and the ability to absorb energy by damping any oscillations that would otherwise be present. Fiber composite materials can easily satisfy the stiffness and weight requirements, but the design of an appropriate self-damping structure is more difficult to achieve.

Viscoelastic materials offer an efficient means of dissipating energy. Although these materials have poor stiffness, they provide an energy dissipative effect in direct proportion to the elastic force applied to them. Since a viscoelastic material is soft, it is typically made in thin layers and held between constraining layers of stiffer elastic materials. Relative motion of the elastic layers induces a shear load in the viscoelastic material and thereby dissipates energy. This is known as constrained layer damping, and is generally limited to damping flexural motions of the damped member. Another prior approach to viscoelastic damping is series damping. In a series damper, the entire load in a member is made to pass as a shear load through the viscoelastic material. This allows the dissipation of a large amount of energy, but no elastic load path is provided through the soft viscoelastic material. Also, failures can often occur in series damping viscoelastic materials, and surface sealing of the material can be difficult. Sealing is important because many viscoelastic materials are inherently unstable and, if not sealed from exposure to the environment, will "outgas" vapors from their surface. This process not only degrades the desirable elastomeric properties of the materials, but also contaminates other materials in the near vicinity. Accordingly, a sealing layer is usually provided over viscoelastic materials, to minimize exposure to sunlight and oxygen.

A variation of the constrained layer approach is to employ a segmented constraining layer, allowing both extensional and flexural motions to be damped. This is discussed in "Constrained Layer Damping Effectiveness of Members under Vibratory Extensional Loading," by Stanley S. Sattinger, presented at the ASME Design Engineering Conference in Cincinnati, Ohio, 1985, paper No. 85-DET-134. The segmented constraint can dissipate only a limited amount of energy, as the underlying elastic structure will always carry a significant portion of the load.

It will be appreciated from the foregoing that there is still considerable room for improvement in damping structures of the general type described. Specifically, what is needed is a structure in which mechanical loads are carried through conventional elastic materials for desired static stiffness, strength and mechanical stability, but in which a significant proportion of the mechanical energy of dynamic loads is transmitted into a viscoelastic material for a desired level of damping. This combination has, prior to the present invention, eluded designers of damping structures.

SUMMARY OF THE INVENTION

The present invention resides in a composite structure of viscoelastic and elastic materials, in which dynamic loads are directed along a path that passes repeatedly through a viscoelastic layer, to maximize damping in the structure. In terms of a novel structure, the invention comprises a continuous sandwich portion formed of viscoelastic material and a first elastic material and the sandwich portion being bounded by two segmented layers of a stiff second elastic material, one on each side of the softer sandwich portion. Each segmented layer of the second elastic material is in contact with the sandwich portion and has alternating segments and gaps such that the segments of one such layer partially overlap the segments of the other layer which is on the opposite side of the sandwich portion. The first elastic material has strength and low stiffness relative to the second elastic material in an intended direction of load transmission through the structure. The second elastic material has high stiffness in the load direction. Dynamic loads in the intended direction of load transmission pass alternately back and forth between the two segmented layers and through the sandwich layer containing the viscoelastic material, to damp the dynamic loads. Static loads applied to the composite structure pass through the first elastic material in the sandwich portion, which provides for static stiffness and strength.

The sandwich portion can be formed from a core layer of first elastic material disposed between layers of viscoelastic material or, alternatively a core layer of viscoelastic material disposed between layers of first elastic material.

In one preferred embodiment of the invention, the composite structure is tubular and all of the layers are annular. In the preferred embodiment, the sandwich portion is constructed from a core layer of first elastic material which has low modulus and high strength, such as fiberglass reinforced composite, disposed between layers of viscoelastic material. The two segmented layers are constructed from annular segments of a second elastic material which has a high modulus, such as graphite fiber reinforced composite. These annular segments are formed in contact with the two layers of viscoelastic material, one layer of segments in contact with the inner surface, and the second layer in contact with the outer surface, alternating with the segments in the first layer along the length of the tube. In this method of construction the second elastic material is chosen to be considerably stiffer than the first elastic material in all directions of loading; axial, bending and torsion. The greater the ratio of stiffness between the second and first elastic material, the greater will be the degree of damping obtained. In the preferred embodiment the choice of materials is instrumental in achieving such a high stiffness ratio and thus directing loads alternately between the outer segments of the second elastic material to the continuous first elastic layer, and thence to the inner segments of the second elastic material or along the continuous first elastic layer to the next outer segments. High static strength is achieved through the choice of a first elastic material having high strength but low modulus. Placing the viscoelastic material between the first and second elastic materials allows strain discontinuities between these dissimilar materials to be absorbed by shearing the viscoelastic core. This avoids degradation of strength due to stress concentrations. The viscoelastic material can, however, be exposed to the environment in the gaps between the annular segments of the first elastic material.

A second embodiment of the invention is similar to the first, employing an alternate configuration in the sandwich portion. In this embodiment the sandwich is formed from two layers of the first elastic material contiguous to a core layer of viscoelastic material. This arrangement allows the viscoelastic material to be sealed from exposure to the environment. The second embodiment has utility in the circumstance where it is desirable to seal the viscoelastic material from exposure to the environment. The annular segments of the second elastic material are in direct contact with the inner and outer surfaces of the first elastic material.

In carrying out the invention one may employ fiber orientation to achieve a high stiffness ratio between the second and first elastic materials in an intended load direction. In one form of the structure, the segmented layers of the second elastic material include predominantly axially oriented fibers, for transmitting axial loads, and the first elastic material in the sandwich portion has a ply arrangement so as to have low stiffness in the axial direction. Such low stiffness may be achieved by selecting the second elastic material to include fibers that are predominantly aligned in directions inclined to the longitudinal axis of the structure. Alternatively, a soft material such as a metal could be used as the second elastic material.

Another form of the structure is designed for transmitting shear or torsional loads, and the segmented layers include predominantly non-axially oriented fibers, for transmitting shear loads. The first elastic material in the continuous sandwich will have low strength and stiffness in a direction transverse to the longitudinal axis of the structure. This may be achieved by means of fibers that are predominantly aligned parallel to the longitudinal axis of the structure.

Another form of the structure is that of a beam, of which the cross-section is other than tubular. Similar principles are employed to provide a path through a layer of viscoelastic material for dynamic loads applied to the beam.

In accordance with one aspect of the invention, the gaps between segments of the segmented layers have a gap length equal to a multiple of a theoretical shear lag length, which is an axial distance required for stress transfer from a segment of one of the segmented layers to an adjacent layer of the first elastic material. In addition, the segments of one segmented layer overlap the segments of the other segmented layer by an overlap length that is also a multiple of the lag length. In one disclosed embodiment, the gap length is approximately three times the lag length and the overlap length is approximately twice the lag length.

The related method of the invention includes the steps of placing annular spacers on a cylindrical mandrel, forming an inner segmented layer on the mandrel in regions between the spacers, forming an inner continuous layer over the inner segmented layer, and curing the resulting structure of inner segmented and continuous layers. The next step is that of laying a viscoelastic layer over the cured inner continuous layer. The next step is that of forming a thin sealing layer over the viscoelastic layer. The thin sealing layer may be of Kapton, for example, and its purpose is to prevent melting of the viscoelastic layer, or merging of the viscoelastic layer with adjacent layers during subsequent curing of the structure. The next steps are forming an outer continuous layer over the sealing layer, optionally placing additional annular spacers over the structure, forming an outer segmented layer over the outer continuous layer and between the optional additional spacers, curing the entire structure, and removing the mandrel and the annular spacers.

The invention may also be viewed as a process for damping dynamic loads in a structure having a sandwich portion made of viscoelastic material and first elastic layers, and two segmented second elastic layers of material of high stiffness in a desired loading direction. The first elastic layer or layers in the sandwich portion have low stiffness in the loading direction. In this sense, the invention includes the steps of applying a dynamic load to the structure in the desired loading direction; conducting the dynamic load forces generally in the desired loading direction, back and forth between the two segmented layers, through layers of the continuous sandwich portion; dissipating dynamic load energy in the viscoelastic layer; and providing at least one path for the conduction of static loads in the loading direction.

It will be appreciated from the foregoing that the present invention represents a significant advance in the field of viscoelastic damping structures. In particular, the use of overlapping segmented elastic layers in conjunction with a sandwich portion made up of viscoelastic layers and additional continuous first elastic layers, results in the establishment of a path for dynamic loads that necessarily passes repeatedly through the viscoelastic layer, thereby maximizing the damping effect. Other aspects and advantages of the invention will become apparent from the following more detailed description, taken in conjunction with the accompanying drawings.

BRIEF DESCRIPTION OF THE DRAWINGS

FIG. 2 A is a cross-sectional view of a tubular viscoelastic material structure in accordance with the present invention, employing a sandwich of a single elastic layer within two viscoelastic layers;

FIG. 2B is a cross-sectional view of a tubular structure similar to FIG. 2A, wherein the arrangement of the sandwich layer is reversed, the viscoelastic layer being enclosed by two soft elastic layers;

FIG. 3 is a cross-sectional view similar to FIG. 2A, wherein primarily axial loads are damped using an appropriate combination of ply orientations;

DESCRIPTION OF THE PREFERRED EMBODIMENTS

Figure 1:
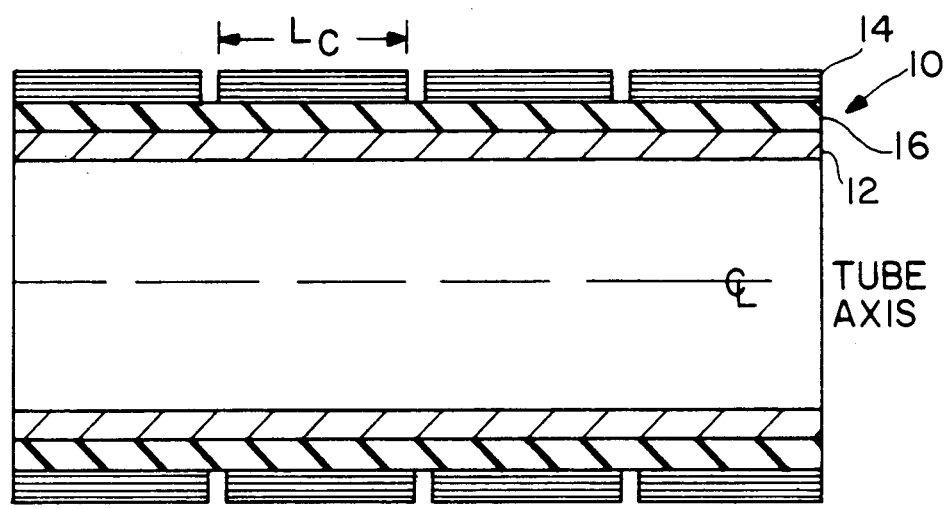
FIG. 1 is a fragmentary cross-sectional view of a tubular viscoelastic material structure of the prior art.

As shown in the drawings for purposes of illustration, the present invention is concerned with damping structures using viscoelastic or similar materials. Damping structures are useful in a variety of applications, but particularly in aircraft and spacecraft, which typically must be light in weight, strong and rigid enough to support static loads, and able to absorb energy from dynamic loads of various types.

Viscoelastic polymers have mechanical damping properties that vary with the frequency of a dynamically applied load, and also vary with temperature. In simple terms, these materials exhibit greater stiffness when a mechanical load is applied to them at a greater frequency. For static or slowly varying loads, the materials are soft and tend to "creep" under the application of load. Viscoelastic materials are ideal components in mechanical structures that are subject to vibrational loads, which may be extensional or shear loads. If the loads can be directed into the viscoelastic materials, the increased stiffness provided will dissipate energy and effectively damp the vibrations. A major difficulty is to design a structure with an appropriate combination of viscoelastic material and conventional elastic material. Since viscoelastic materials are virtually incapable of supporting a static load, a static load path must be provided through conventional elastic materials.

FIG. 1 illustrates one approach of the prior art, as used in a tubular structural element, indicated by reference numeral 10, subject to axial loading. The tubular element 10 includes three concentric layers: an inner layer 12, a segmented outer constraint layer 14, and an intermediate layer 16 of viscoelastic material. The inner and outer layers 12 and 14 are of conventional elastic materials, which deform elastically in response to an applied load, in a uniform and usually linear manner.

The following comments concerning the selection of elastic and viscoelastic materials apply both to the present invention and to prior art structures such as the one shown in FIG. 1. In the type of lightweight aerospace structures to which the invention may be usefully applied, these elastic materials consist of fibers bound together by a matrix. The fibers may be, for example, graphite, fiberglass, boron, or Kevlar. Graphite fibers include pitch based materials designated, for example, P-75, P-100, and P-120, and PAN based materials designated, for example, GY-70 and T300. Glass fibers include S-glass and E-glass. Plastic matrix materials may be an epoxy, such as Fiberite 934, or a thermoplastic resin, such as PEEK (poly-ether-ether-ketone). In the case of graphite fiber reinforced plastics, the matrix materials have only a minor influence on the mechanical properties of the elastic components, and the fibers carry 95% or more of the mechanical load. In the case of fiberglass reinforced plastics the glass fibers are so soft that the matrix material contributes a considerable portion of the stiffness. A metal matrix may also be used, such as aluminum, copper or magnesium. For metal matrix composites the metal binding the fibers adds considerable stiffness and strength, both parallel to and transverse to the fibers.

The fibers of the elastic materials may be laid in any desired orientation, or in a suitable mix of orientations. Since the fibers are largely responsible for the conduction of load through the materials, the selection of orientation is an important factor in the design of the structure. A "normal" layup of an elastic component of this type includes a mix of fibers laid in different orientations, so that the material has desired stiffness and strength in two directions in the plane of the material. Stiffness and strength can dominate in a preferred direction, but must also be provided to a degree in the transverse direction. In the tubular structure of the prior art shown in FIG. 1, the inner layer 12 is of a material of such a normal layup. On the other hand, the outer segmented layer 14 has fibers aligned only in the axial direction, as indicated in the drawing by the shading of this layer. The outer layer 14 is, therefore, capable of transferring loads only in the axial direction. When subjected to transverse shear forces, as in the transmission of a torsional load, the outer layer 14 provides little, if any, stiffness or strength.

The viscoelastic material in layer 16 may be selected from various rubbers or plastics, such as PVC (polyvinyl chloride); adhesives, such as Scotchdamp SJ2015X or SJ2052X polymers manufactured by the 3M Company, St. Paul, Minn.; or silicones, such as Densil, manufactured by Flexcon, Inc. The material and its thickness are chosen for optimum operation at the expected temperature and frequency of vibration.

The structure of FIG. 1 transmits static axial loads primarily through the inner elastic layer 12, since the viscoelastic layer 16 will transmit little, if any, static load and the outer layer is axially discontinuous. Under dynamic loading, however, the viscoelastic layer 16 becomes stiffer and, although some of the load will continue to be transmitted through the inner layer 12, a substantial proportion of the load will be transmitted alternately by the viscoelastic layer 16 and segments of the outer layer 14. Because the outer layer 14 is segmented, axially transmitted loads are forced to take a path through the viscoelastic layer 16, which provides a desired damping effect. Although this arrangement produces damping, it still leaves an unimpeded, and undamped, load path through the inner elastic layer 12.

The structure of the present invention as embodied in the tubular construction of FIGS. 2A and 2B. FIG. 2A includes the sandwich portion 18 made up of a soft first elastic core layer 20, contiguous to viscoelastic layers 22 and 24, one on each side of the layer 20, and segmented outer and inner stiff second elastic layers 26 and 28. In the circumstance the soft elastic layer 20 is significantly more flexible than the stiff elastic layers in both extensional and shear deformations it will result in axial, bending and torsional vibratory deformations in the tubular structure will all be damped. Any load applied to the soft elastic layer 20 will encounter alternately stiff material in the segmented layers 26, 28. Loads are transmitted alternately between the soft elastic layer 20, through the viscoelastic layer 22, to the segmented layer 28, back through the viscoelastic layer 22, to the soft elastic layer 20, then through the viscoelastic layer 24, to the segmented layer 26. An important feature is that the segments of layers 26, 28 are overlapped or staggered, such that any gap in one of the segmented layers is not radially aligned with a gap in the other segmented layer. This staggering of the stiff segments on opposite sides of the sandwich portion 18, which is more flexible than layers 26 and 28, serves to amplify dynamic load transmission through the viscoelastic material. One may notice that the viscoelastic layers 22, 24 are exposed to the environment in the gaps between the segmented layers 26, 28, and that thin sealing layers, as hereinafter described, should be added to avoid this exposure.

Under conditions of static loading the tube of FIG. 2A there is provided a load path parallel to the dynamic load path through the segmented elastic layers 26 and 28. A static load such as axial, bending, shear or torsional loads will be transmitted directly through the continuous soft elastic layer 20. Neither the viscoelastic layers 22, 24 nor the segmented elastic layers 26, 28 contribute to static stiffness. In dynamic loading, a small proportion of the load is carried along this path, but because the viscoelastic material of layers 22, 24 exhibits increased stiffness, a large proportion of the load is transmitted back and forth from one segmented elastic layer 26, 28 to the other, through the intervening viscoelastic layers 22, 24 and the soft, first elastic layer 20. Because the bulk of the load is forced through the viscoelastic layers 22, 24 the damping effect of this material is fully utilized and the desired damping of vibrational loads is achieved.

Another configuration for the composite structure is shown in FIG. 2B. The alternate sandwich portion indicated by the general reference numeral 49 succeeds in sealing the viscoelastic layer completely from the environment. This configuration has two parallel elastic load paths for the transmission of static loads. Static loads are transmitted along the two continuous elastic layers 52 and 54. The stiff segmented layers 56, 58 are affixed to and contiguous with the elastic layers 52 and 54 respectively and so contribute to the static stiffness. The configuration in FIG. 2B is thus stiffer in relation to static loads than the composite structure in FIG. 2A. A considerable amount of damping can be obtained from the configuration in FIG. 2B although it will be less than what is obtained in FIG. 2A since dynamic shear stresses will be induced in only the single viscoelastic layer 50. Since the strain discontinuities are partially absorbed in the transition from the segmented stiff elastic layers 56, 58 to the continuous soft elastic layers 52 and 54 the magnitude of the shear stresses in the viscoelastic layer 50 will also be lower than in the preferred embodiment shown in FIG. 2A.

It will be appreciated that the fibre orientation and alignment of the plies that make up the individual layers may be employed to control the damping response of the composite structure to specific kinds of load. Fibre orientation has been found to control stiffness in different directions. FIG. 3 shows the invention as applied to the damping of axial loads. The structure i similar to that of FIG. 2A expect that the elastic materials have highly non-isotropic stiffness in extension and shear. The structure inc includes the viscoelastic material layers 22' and 24', a soft first elastic layer 20', and outer and inner segmented second elastic layers 26' and 28'. The soft elastic layer 20' in this case is soft in the sense of an applied axial load. This may be achieved by constructing the layer primarily from angle plies having fibers aligned at an inclination to the axis of the tube along which the load is applied. The outer and inner segmented layers 26', 28' are selected to be stiff in the sense of transmitting axial loads, and primarily include axial plies having fibers oriented along the tube axis. Dynamic loads in the axial direction will be damped in a manner similar to that described for the construction of FIG. 2A since the continuous elastic layer 20' will be soft in the axial direction and the segmented elastic layers 26', 28' will be stiff in the axial direction. Dynamic axial loads are transmitted along the structure through the inner and outer segmented layers 26', 28' alternately, passing repeatedly through the energy absorbing viscoelastic layers 22', 24.' Since the transmission of bending loads involves equal and opposite extensional deformations on opposite sides of the tube, this construction will also succeed in damping vibratory bending loads. Being stiff in shear the continuous soft elastic layer 20' will also transmit any torsional loads on the structure, but with little or no damping effect.

Figure 4:
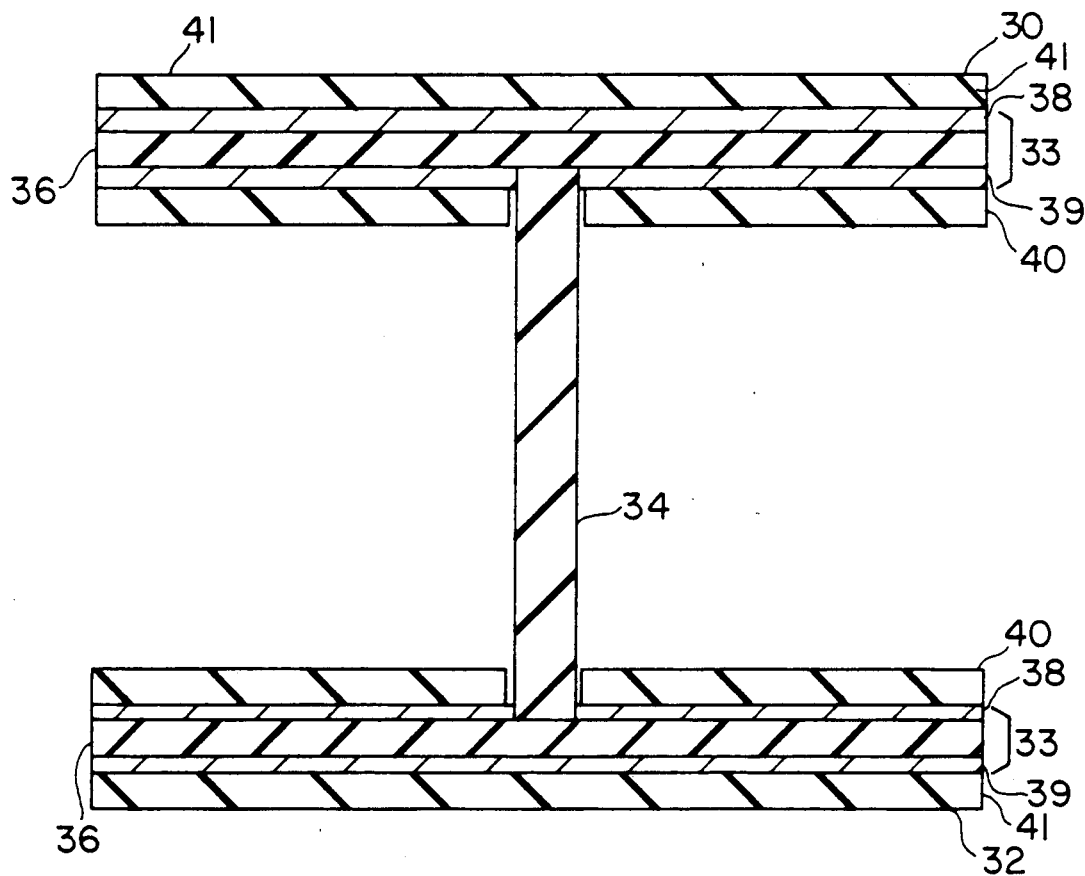
FIG. 4 is a cross-sectional view of an I-beam structure using a viscoelastic material in accordance with the present invention.
Figure 5:
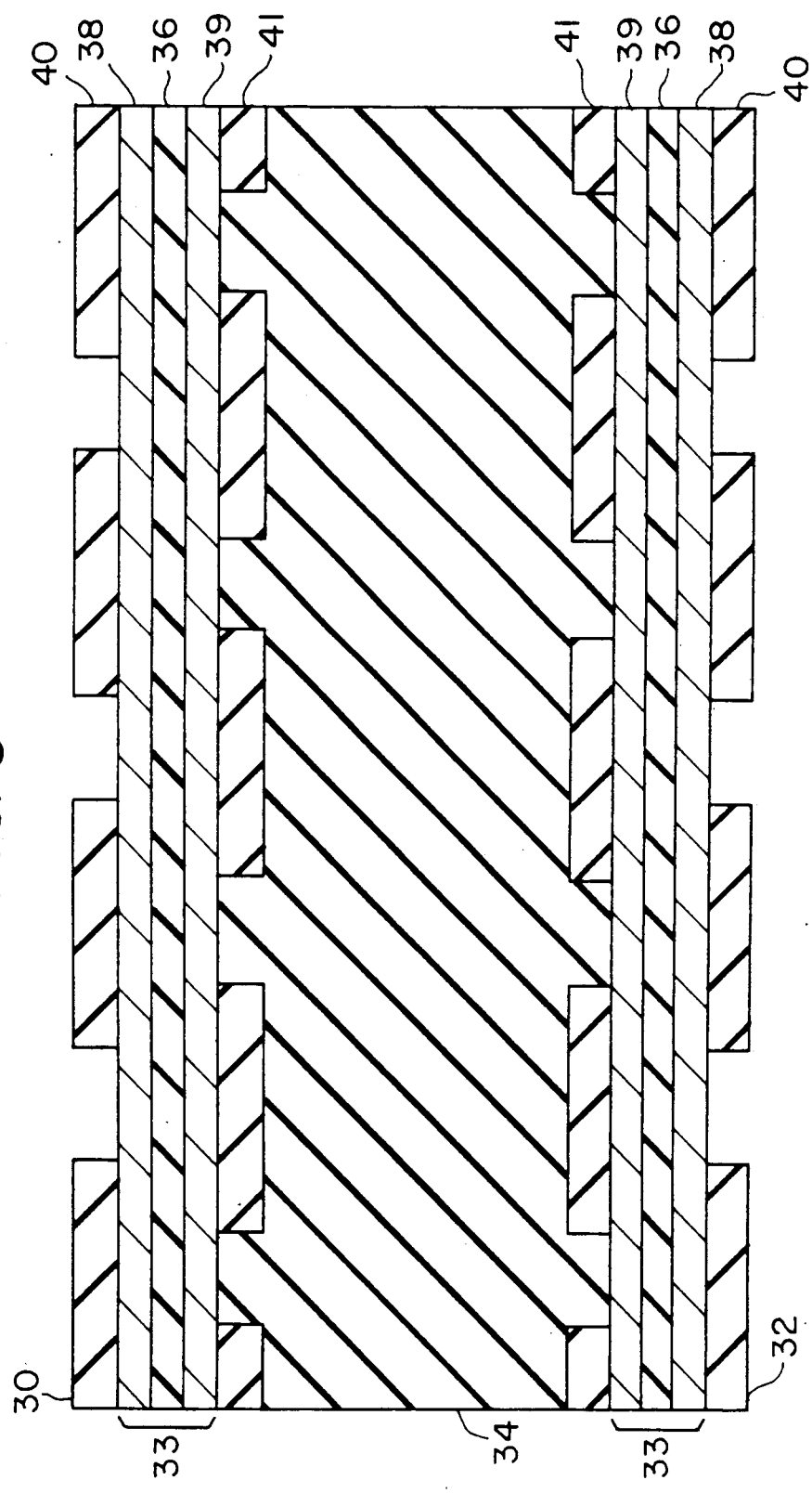
FIG. 5 is a cross-sectional view of the I-beam structure of FIG. 4, taken substantially along the line 4—4.

FIG. 4 shows the concept of the invention as applied to an I-beam structure comprising two flanges 30, 32 which include sandwich portions 33 and an intermediate web 34. Each of the sandwich portions 33 has a central layer 36 of soft elastic material, two adjacent layers 38 and 39 of viscoelastic material, and two outer segmented layers 40 and 41 of stiff elastic material. The web element 34 is shown as including a single layer of soft elastic material. As best seen in FIG. 5, the outer layers 40 of the flanges 30, 32 are segmented in such a manner that the gaps between segments on one face of flange 30 are not aligned with gaps between segments on face of flange 32.

In static axial loading, the continuous elastic layers 36 will transmit the load in both flanges. In dynamic axial loading, the viscoelastic material layers 38 and 39 will provide damping as the load is transmitted along the beam, through alternating segmented layers 40 and 41.

Depending on the application, it may not be necessary to provide the type of structure described along the full length of a structural member. For example, a structural member of stiff elastic material may be designed to include only a single discontinuity, at which loads are transmitted through an adjacent "soft" elastic material, then through a relatively short layer of viscoelastic material, into an overlapping layer of stiff material, and back into a continuation of the original member. The portion of FIG. 2A indicated by 48, for example, shows such a structure, where the inner layer 28 is considered to be continuous in both directions from single break appearing in the portion 47, and the lengths of the continuous layer 20 and of the viscoelastic layers 22, 24 are approximately the same as the length of one segment of the outer layer 26.

Figure 6:
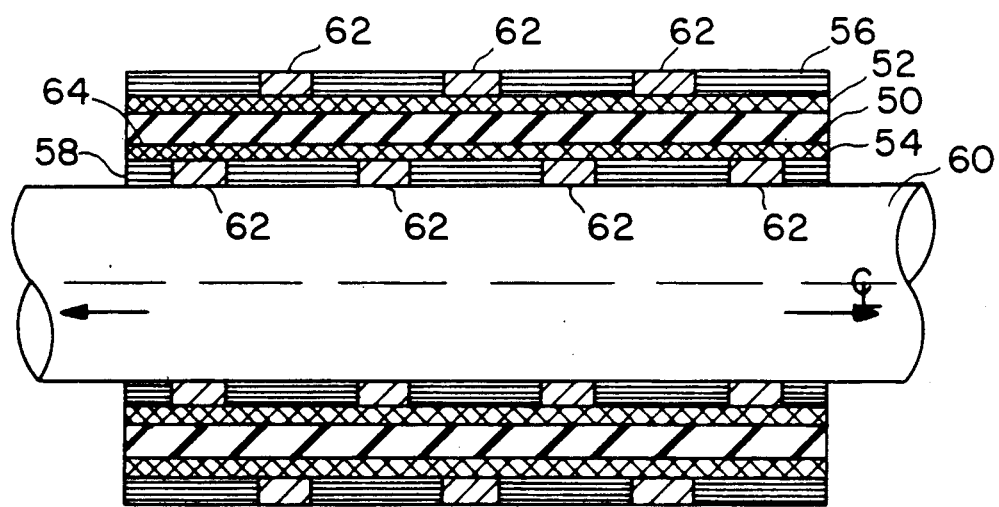
FIG. 6 is a cross-section vies similar to FIG. 2A illustrating the method of fabrication of the structure.

Another important aspect of the invention is that tubular members embodying the principles of the invention may be conveniently manufactured using an improved process that is well suited for a graphite fiber structure. In accordance with the method, which will now be described for the axial load damping version of FIG. 2B, segments of the inner layer 58 are first applied over a steel or aluminum mandrel, as shown at 60 in FIG. 6, with annular spacers 62 of Teflon or the like being first applied to the mandrel to form the segment spaces in the layer. Then the continuous "soft" layer 64 is applied over the inner layer 58, and the resultant structure is cured in an autoclave under increased temperature and pressure, or in a vacuum bag. Next the viscoelastic layer 50 is applied over the cured structure, and a thin layer of Kapton 64 is applied over the viscoelastic layer 50 to prevent it from melting into the fibers of the outer tube next to be formed. Then the angled plies of layer 52 are applied, and the segmented plies of the outer layer 56, optionally using further spacers 62. The whole tube is then cured as one part, and finally the mandrel 60 and spacers 62 are removed.

The method described allows the viscoelastic material layer to be embedded in the composite structure without its melting or merging with the adjacent graphite/epoxy layer of the outer tube. The Kapton layer 64 functions to seal and protect the viscoelastic layer during subsequent steps of the method, and permits the entire tube structure to be cured as one piece.

The specific dimensions chosen for a structure in accordance with the invention will be very much dependent on the application of the structure and the specific materials used. An important factor in the design is the axial tube length required to transfer load from a segment of the outer or inner layer 26, 28 (FIG. 2A) to the continuous layer 20 in the gap region between segments. This length is referred to as the decay length or the shear lag length, and is a function of axial modulus of the two elastic materials, the shear modulus of the viscoelastic material, and the thicknesses of the various layers. The decay length is given by the expression:

$$t = \sqrt{\frac{eg\ tg\ tv}{Gv[1 + (Eg\ tg)/(Ew\ tw)]}}$$

where:
Eg and Ew are the axial modulus values in the 0° direction of the gap and wall, i.e. layers 20 and 26, respectively,
tg and tw are the thicknesses of layers 20 and 26, respectively, and
tv and Gv are the thickness and shear modulus of the viscoelastic layer 22.

For one tube structure built and tested, the decay length t was computed to be approximately 0.5 inch. Good results were obtained by choosing the gap length Lg at 3t=1.5 inch, and the overlap length Lo at 2t=1.0 inch. The length of a single wall section of a segment is then Lw=2Lo+Lg=3.5 inches, and the periodic or cell length Lc=Lw+Lg=5.0 inches.

The thickness, tv, of the viscoelastic material is chosen to give a desired value of t. The larger the thickness, the greater is the cell length. A longer cell length reduces fabrication costs, but too much thickness of the viscoelastic layer adds weight to the structure. The wall thickness, tw, is chosen to give a desired stiffness to the structure. The gap thickness, tg, is chosen to be as small as possible, unless needed for strength.

A comparison of two tubular structures, one in accordance with the invention (FIGS. 2A and 2B) and one following the teachings of the prior art (FIG. 1) predicted an energy absorption factor of 10% for the prior art device. That is to say, 10% of the dynamic load energy was absorbed into the viscoelastic material. The corresponding figure for the structure of the invention was 40%, indicating an improvement over the prior art structure by a factor of four.

It will be appreciated from the foregoing that the present invention represents a significant advance in the field of damping mechanical structures. In particular, the invention provides viscoelastic damping for various types of dynamically loaded members. The invention also provides a novel technique for fabricating a viscoelastic structural member. It will also be appreciated that, although various embodiments of the invention have been described in detail for purposes of illustration, various modifications may be made without departing from the spirit and scope of the invention. Accordingly, the invention is not to be limited except as by the appended claims.

We claim:

1. A viscoelastic damping structure, comprising:
   a multilayered sandwich portion including viscoelastic layer material;
   two segmented layers of a first elastic material disposed one on each side of the layer of viscoelastic material, each segmented layer having alternating segments and gaps, such that the segments of one such layer partially overlap the segments of the other layer, the first elastic material having strength and stiffness in a direction corresponding to an intended direction of load transmission through the structure; and
   second elastic material contiguous with said viscoelastic material of said sandwich portion, said second elastic material having low strength and stiffness in the direction corresponding to an intended direction of load transmission through the structure;
   whereby dynamic loads in the intended direction of load transmission pass back and forth between the two segmented layers and through the viscoelastic material layer, to damp the dynamic loads.

2. A viscoelastic damping structure ss defined in claim 1, wherein:
   the sandwich portion comprises a core layer of said second elastic material, and two layers of said viscoelastic material disposed on each side of the core layer and in contact with respective ones of the segmented layers.

3. A viscoelastic damping structure ad defined in claim 1, wherein:
   the sandwich portion comprises a core layer of viscoelastic material, and two layers of said second elastic material disposed on each side of the core layer and in contact with respective ones of the segmented layers.

4. A viscoelastic damping structure as defined in claim 1, wherein:
   the structure is tubular; and
   all of the layers are annular.

5. A viscoelastic damping structure as defined in claim 1, wherein:
   the segmented layers include predominantly axially oriented fibers, for transmitting axial loads; and
   the second elastic material has low strength and stiffness in the axial direction.

6. A viscoelastic damping structure as defined in claim 2, wherein:
   the core layer of the second elastic material includes fibers that are predominantly aligned in directions inclined to the longitudinal axis of the structure.

7. A viscoelastic damping structure as defined in claim 2, wherein:
   the segmented layers include predominantly non-axially oriented fibers, for transmitting shear loads; and
   the core layer of the second elastic material have low strength and stiffness in a direction transverse to the longitudinal axis of the structure.

8. A viscoelastic damping structure as defined in claim 2, wherein:
   the core layer of the second elastic material include fibers that are predominantly aligned in parallel to the longitudinal axis of the structure.

9. A viscoelastic damping structure as defined in claim 3 wherein:

the two layers of the second elastic material include fibers that are predominantly aligned in directions inclined to the longitudinal axis of the structure.

10. A viscoelastic damping structure as defined in claim 3 wherein:
the segmented layers include predominantly non-axially oriented fibers, for transmitting shear loads; and
the two layers of the second elastic material have low strength and stiffness in a direction transverse to the longitudinal axis of the.

11. A viscoelastic damping structure as defined in claim 1, wherein:
the structure is a beam;
the sandwich portion is comprised of a core layer of second elastic material disposed between layers of viscoelastic material, one on each side of said core layer; and
the two segmented layers are formed in contact with the two viscoelastic layers.

12. A viscoelastic damping structure as defined in claim 1, wherein:
the gaps between segments of the segmented layers have a gap length equal to a multiple of a theoretical lag length, which is an axial distance required for stress transfer from a segment of one of the segmented layers to the adjacent layer of the second elastic material; and
the segments of one segmented layer overlap the segments of the other segmented layer by an overlap length that is also a multiple of the lag length.

13. A viscoelastic damping structure as defined in claim 12, wherein:
the gap length is approximately three times the lag length; and
the overlap length is approximately twice the lag length.

14. A tubular viscoelastic damping structure, comprising:
an annular sandwich portion comprised of multiple continuous layers including viscoelastic material and elastic material;
two segmented layers of elastic material, disposed one on each side of sandwich portion and in contact with respective ones of the continuous layers, each segmented layer having alternating segments and gaps, such that the segments of one such layer partially overlap the segments of the other layer, the elastic material of the segmented layers having high strength and stiffness in the direction corresponding to the intended direction of load transmission through the structure;
whereby dynamic loads in the intended direction of load transmission pass back and forth between the two segmented layers and through the layer of viscoelastic material, to damp the dynamic loads.

15. A viscoelastic damping structure as defined in claim 14, wherein:
the segmented layers include predominantly axially oriented fibers, for transmitting axial loads; and
the sandwich portion comprises a core layer of elastic material and two continuous layers of viscoelastic material, one on each side of the core layer, the elastic material having low strength and stiffness in a direction corresponding to an intended direction of load transmission through the structure.

16. A viscoelastic damping structure as defined in claim 15, wherein:
the continuous elastic layers include fibers that are predominantly aligned in directions inclined to the longitudinal axis of the structure.

17. A viscoelastic damping structure as defined in claim 14, wherein:
the segmented layers include predominantly non-axially oriented fibers, for transmitting shear loads; and
the core layer has low strength and stiffness in a direction transverse to the longitudinal axis of the structure.

18. A viscoelastic damping structure as defined in claim 15, wherein:
the core layer includes fibers that are predominantly aligned parallel to the longitudinal axis of the structure.

19. A viscoelastic damping structure as defined in claim 14, wherein:
the gaps between segments of the segmented layers have an axial gap length equal to a multiple of a theoretical lag length, which is an axial distance required for stress transfer from a segment of one of the segmented layers to the adjacent continuous layer; and
the segments of one segmented layer overlap the segments of the other segmented layer by an overlap length that is also a multiple of the lag length.

20. A viscoelastic damping structure as defined in claim 19, wherein:
the gap length is approximately three times the lag length; and
the overlap length is approximately twice the lag length.

21. A viscoelastic damping structure as defined in claim 14, wherein:
the segmented layers and the continuous layers include fibers laid in a selected orientation in a matrix material.

22. A viscoelastic damping structure as defined in claim 21, wherein:
the fibers are of graphite and the matrix is an epoxy material.

* * * * *